C. R. BRYANT.
PACKING RING FOR PISTON RODS.
APPLICATION FILED APR. 19, 1913.

1,072,306.

Patented Sept. 2, 1913.

Witnesses
Wm. H. Mulligan.
D. W. Gould.

Inventor
Clarence R. Bryant.

By Victor J. Evans.
Attorney

UNITED STATES PATENT OFFICE.

CLARANCE ROSS BRYANT, OF FORT WORTH, TEXAS.

PACKING-RING FOR PISTON-RODS.

1,072,306.  Specification of Letters Patent.  Patented Sept. 2, 1913.

Application filed April 19, 1913. Serial No. 762,317.

*To all whom it may concern:*

Be it known that I, CLARANCE R. BRYANT, a citizen of the United States, residing at Fort Worth, in the county of Tarrant and State of Texas, have invented new and useful Improvements in Packing-Rings for Piston-Rods, of which the following is a specification.

The invention relates to packing rings for pistons and particularly to a ring which may be conveniently and readily applied and which will when in place form an effective packing without inducing undue wear upon the cylinder.

The main object of the present invention is the provision of a packing ring made in sections, divided to provide open ring forms and arranged in break joint relation to insure continuity of the ring as a whole to prevent leakage, the main ring member having its outer or bearing surface eccentric with relation to its inner or engaging surface to provide for equalization of the ring pressure within the cylinder.

The invention in its preferred form of details will be described in the following specification, reference being had particularly to the accompanying drawings, in which:—

Figure 1:
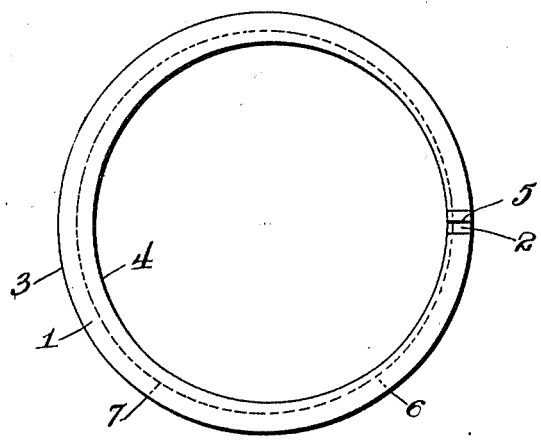
Figure 2:
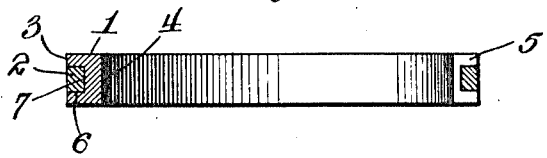
Figure 3:
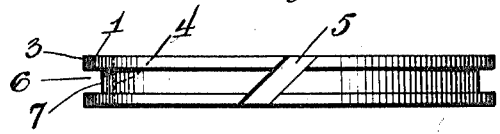
Figure 4:
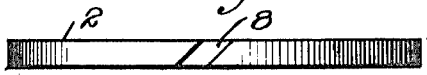

Figure 1 is a plan of the improved packing ring. Fig. 2 is a vertical section. Fig. 3 is an edge view of the main ring. Fig. 4 is an edge view of the auxiliary ring.

Referring particularly to the accompanying drawings, the packing ring which, as will be understood is to be constructed of any appropriate material and in any size desired, includes essentially two members, a member 1 hereinafter termed the main ring member, and a member 2 hereinafter termed the auxiliary ring member.

The main ring member 1 comprises an annular body having its outer peripheral edge 3 eccentrically disposed with relation to its inner peripheral edge 4. The wall of the body is divided at 5 to provide for the necessary expansion and contraction, the line of division being on an angularly related plane or of interfitting step formation. The body is formed with a channel 6 in a relatively outer edge thereof, said channel extending part way through the wall of the body and having its bottom wall 7 concentric with the outer edge of the body.

The auxiliary ring 2 comprises an annular member divided at 8, with any appropriate form of division line and of a size to snugly fit in the channel 6.

The rings in their associated position are arranged to break joint so as to form an unbroken bearing surface as is usual in this type of device.

The improved packing ring will equalize itself in the cylinder by reason of the eccentric relation of the bearing surface to the piston, and hence I am enabled by this type of ring to use the same in high pressure cylinders without leakage.

It will be appreciated that the present invention is not specifically limited to forming the channel 6 in the center of the outer surface of the main ring, as said channel with equal efficiency may be formed to one side or the other of the center, or otherwise provided.

What is claimed is:—

A packing ring including interrupted ring members, one of said members being formed with a channel in its outer edge having the base wall thereof eccentric with relation to the inner bearing surface of the member, the other member fitting in said channel.

In testimony whereof I affix my signature in presence of two witnesses.

CLARANCE ROSS BRYANT.

Witnesses:
H. C. EVANS,
C. M. TEMPLETON.